US009756064B2

(12) United States Patent
Lee

(10) Patent No.: US 9,756,064 B2
(45) Date of Patent: *Sep. 5, 2017

(54) APPARATUS AND METHOD FOR COLLECTING HARMFUL WEBSITE INFORMATION

(71) Applicant: Foundation of Soongsil University-Industry Cooperation, Seoul (KR)

(72) Inventor: Sangjun Lee, Seongnam-si (KR)

(73) Assignee: Foundation of Soongsil University-Industry Cooperation, Seoul (KR)

( * ) Notice: Subject to any disclaimer, the term of this patent is extended or adjusted under 35 U.S.C. 154(b) by 49 days.

This patent is subject to a terminal disclaimer.

(21) Appl. No.: 14/654,670

(22) PCT Filed: Jul. 9, 2013

(86) PCT No.: PCT/KR2013/006098
§ 371 (c)(1),
(2) Date: Jun. 22, 2015

(87) PCT Pub. No.: WO2014/098337
PCT Pub. Date: Jun. 26, 2014

(65) Prior Publication Data
US 2015/0319184 A1  Nov. 5, 2015

(30) Foreign Application Priority Data
Dec. 20, 2012 (KR) .................. 10-2012-0149671

(51) Int. Cl.
*H04L 29/06* (2006.01)
*G06F 17/30* (2006.01)
(Continued)

(52) U.S. Cl.
CPC ...... *H04L 63/1425* (2013.01); *G06F 17/3089* (2013.01); *G06F 21/51* (2013.01);
(Continued)

(58) Field of Classification Search
CPC . G06F 21/56; H04L 63/1441; H04L 63/1483; H04L 63/168
See application file for complete search history.

(56) References Cited

U.S. PATENT DOCUMENTS 6,996,845 B1  2/2006  Hurst et al.
7,698,442 B1  4/2010  Krishnamurthy et al.
(Continued)

FOREIGN PATENT DOCUMENTS

JP  2009037420 A  2/2009
KR  2001-0103131 A  11/2001
(Continued)

OTHER PUBLICATIONS

Gyongyi et al., "Combating Web Spam with TrustRank", 2004, pp. 576-587.*
(Continued)

*Primary Examiner* — Thaddeus Plecha
(74) *Attorney, Agent, or Firm* — Novick, Kim & Lee, PLLC; Sang Ho Lee

(57) ABSTRACT

Provided are a harmful site collection device and method for determining a harmful site by analyzing a connection between harmful sites. The harmful site collection device includes a harmful site database configured to store a URL of a harmful site; a web page collection and extraction unit configured to collect a web page indicated by the URL of the harmful site and extract a linked URL; and a harmful site connection analysis unit configured to calculate a connection with other web pages referenced within a web page of the linked URL to determine whether the web page is a harmful
(Continued)

(a)

(b)

(c)

CONFIRMED HARMFUL SITE    PROVISIONAL HARMFUL SITE site. Accordingly, the harmful site collection device can determine a harmful site more easily only with information regarding the URL linked to the web page.

10 Claims, 8 Drawing Sheets

(51) Int. Cl.
*G06F 21/56* (2013.01)
*G06F 21/51* (2013.01)

(52) U.S. Cl.
CPC ............ *G06F 21/56* (2013.01); *G06F 21/566* (2013.01); *H04L 63/14* (2013.01); *H04L 63/1441* (2013.01); *H04L 63/1483* (2013.01); *H04L 63/168* (2013.01); *H04L 63/1408* (2013.01)

(56) References Cited

U.S. PATENT DOCUMENTS

| | | | | |
|---|---|---|---|---|
| 8,429,750 | B2* | 4/2013 | Bennett | G06F 17/30864 707/726 |
| 9,356,941 | B1* | 5/2016 | Kislyuk | H04L 63/14 |
| 2006/0041540 | A1* | 2/2006 | Shannon | G06F 17/30882 |
| 2007/0005652 | A1 | 1/2007 | Choi et al. | |
| 2008/0086555 | A1* | 4/2008 | Feinleib | G06F 17/30705 709/224 |
| 2009/0198673 | A1* | 8/2009 | Gao | G06F 17/30864 |
| 2010/0186088 | A1 | 7/2010 | Banerjee et al. | |
| 2010/0262693 | A1 | 10/2010 | Stokes et al. | |
| 2012/0096553 | A1* | 4/2012 | Srivastava | G06F 21/56 726/24 |

FOREIGN PATENT DOCUMENTS

| | | |
|---|---|---|
| KR | 20070003495 A | 1/2007 |
| KR | 10-0848319 B1 | 7/2008 |
| KR | 20090075524 A | 7/2009 |

OTHER PUBLICATIONS

Young-Hun Jang, "Automatic Harmful Website Rating System Based on Hyperlink Relationship" (May 2005).

Shin, Eun-Jeong, 'Design and implementation of a parallel web crawler for large-scale search engines. Thesis (MA)', [Online] 2007, Retrieved from the Internet: <URL:http://library.kaist.ac.kr/thesis02/2007/2007M020053301_SIVer2.pdf>.

Zoltan Gyongyi et al., 'Combating Web Spam with TrustRank' Proceedings of the 30th VLDB (Very Large Data Bases) Conference vol. 30, 2004, Toronto, Canada, pp. 576-587.

* cited by examiner

APPARATUS AND METHOD FOR COLLECTING HARMFUL WEBSITE INFORMATION

TECHNICAL FIELD

The present invention relates to a harmful site collection device and method in which a harmful site is automatically determined and added to a list.

BACKGROUND ART

The wide use of a global network such as the Internet that links devices worldwide has brought rapid changes in modern people's daily life. The old era is gone in which people strive for information, and a new era has come in which it is important how useful information is selected from an overflowing abundance of information stored in information database that is easily accessible via the Internet. Actually, the sharing of information through the Internet has contributed amazingly to the technical development by and knowledge sharing between modern people. However, easy accessibility and rapid information diffusion also involve many side effects.

Examples of the side effects caused by the Internet may include the leakage and easy accessibility of personal information due to poor security and the flood of pornographic materials commercially available on the Internet. Actually, it is statistically known that the most commercially successful business among Internet businesses is a pornographic material business, and thus the distribution of the pornographic materials through the Internet causes a big social issue.

People from children to adults who can use their personal computer without any difficulty are randomly exposed to harmful sites. Thus, hardware devices and software programs are being developed to prevent computer terminals from accessing such harmful sites at home or in office.

A harmful site blocking technique is largely divided into two: a method of analyzing contents of a website in real time to determine whether the website is harmful or not; and a method of using a harmful site database to block access to the harmful sites. Most harmful site blocking techniques used in the present employ the method of using a harmful site database to block access to the harmful sites. This method is more convenient and effective than the real-time analysis method.

However, new harmful sites are constantly appearing, and contents and addresses of the websites are frequently changed. Thus, it is difficult and also takes too much time for people to manually maintain the harmful site database in the latest version.

DISCLOSURE

Technical Problem

The present invention is directed to providing a harmful site collection device and method, which analyze a connection between harmful sites and automatically determine a harmful site.

Technical Solution

One aspect of the present invention provides a harmful site collection device including: a harmful site database configured to store a URL of a harmful site; a web page collection and extraction unit configured to collect a web page indicated by the URL of the harmful site to extract a linked URL; and a harmful site connection analysis unit configured to calculate a connection with other web pages referenced within a web page of the linked URL to determine whether the web page of the linked URL is a harmful site.

The harmful site collection device may further include a URL processing unit configured to divide the linked URL extracted by the web page collection and extraction unit into a sub-page URL and an other-page URL and extract a representative URL in which a subdirectory of the other-page URL is removed therefrom.

The URL processing unit may compare the representative URL with a URL of a harmful site stored in the harmful site database and remove the representative URL when the representative URL is the same as the URL of the harmful site.

The harmful site database may store a URL of a confirmed harmful site and a URL of a provisional harmful site.

The harmful site connection analysis unit may calculate a connection with other web pages referenced within a web page of the URL of the provisional harmful site to determine whether the web page of the linked URL is a harmful site.

The harmful site connection analysis unit calculating a connection with other web pages referenced within a web page of the linked URL to determine whether the web page of the linked URL is a harmful site may include calculating a directed graph indicated by the connection between the web pages referenced within the web page of the linked URL and confirming the web page of the linked URL as a harmful site when at least one of the web pages included in the directed graph is the same as a harmful site prestored in the harmful site database.

Another aspect of the present invention provides a harmful site collection device including: a harmful site database configured to store a URL of a confirmed harmful site and a URL of a provisional harmful site; a web page collection and extraction unit configured to collect a web page indicated by the URL of the confirmed harmful site and extract a linked URL; a URL processing unit configured to divide the URL linked to the web page indicated by the URL of the confirmed harmful site into a sub-page URL and an other-page URL, extract a representative URL in which a subdirectory of the other-page URL is removed therefrom, and store the extracted representative URL in a provisional harmful site list of the harmful site database; and a harmful site connection analysis unit configured to calculate a connection with other web pages referenced in the web page of the URL of the provisional harmful site to determine whether the provisional harmful site is a harmful site.

The harmful site collection device may further include a harmful site rank calculation unit configured to calculate a harmful site rank of the provisional harmful site, which is not confirmed as a harmful site by the harmful site connection analysis unit.

The harmful site rank calculation unit may calculate the harmful site rank according to the number of confirmed harmful sites that reference the provisional harmful site.

Still another aspect of the present invention provides a method of collecting a harmful site, the method including: extracting a URL linked to a web page of a harmful site; and checking a connection with at least one web page referenced by the web page of the URL and determining whether the web page of the URL is the harmful site according to the connection.

The extracting of a URL linked to a web page of a harmful site may include downloading the harmful site and extracting all URLs linked to the harmful site in a web crawling technique.

The checking of a connection with at least one web page referenced by the web page of the URL may include calculating a directed graph with the at least one web page referenced by the web page of the URL to check the connection.

When a predetermined confirmed harmful site is included in the directed graph, the web page of the URL may be confirmed as the harmful site.

When the web page of the URL is not the harmful site, a harmful site rank of the web page of the URL may be calculated.

The calculating of a harmful site rank of the web pate of the URL may include calculating the harmful site rank according to the number of harmful sites that reference the web page of the URL.

Advantageous Effects

As described above, according to one aspect of the present invention, the harmful site collection device can determine a harmful site more easily using a connection of a URL linked to a web page.

MODES OF THE INVENTION

Hereinafter, exemplary embodiments of the present invention will be described in detail with reference to the accompanying drawings. In adding reference numbers for elements in each figure, it should be noted that like reference numbers already used to denote like elements in other figures are used for elements wherever possible.

Figure 1:
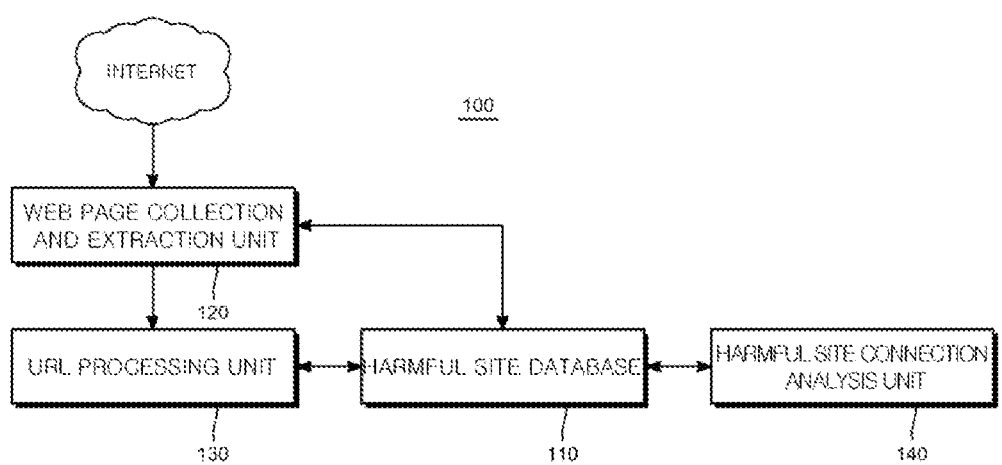
FIG. 1 is a block diagram showing a harmful site collection device according to an embodiment of the present invention.
Figure 2:
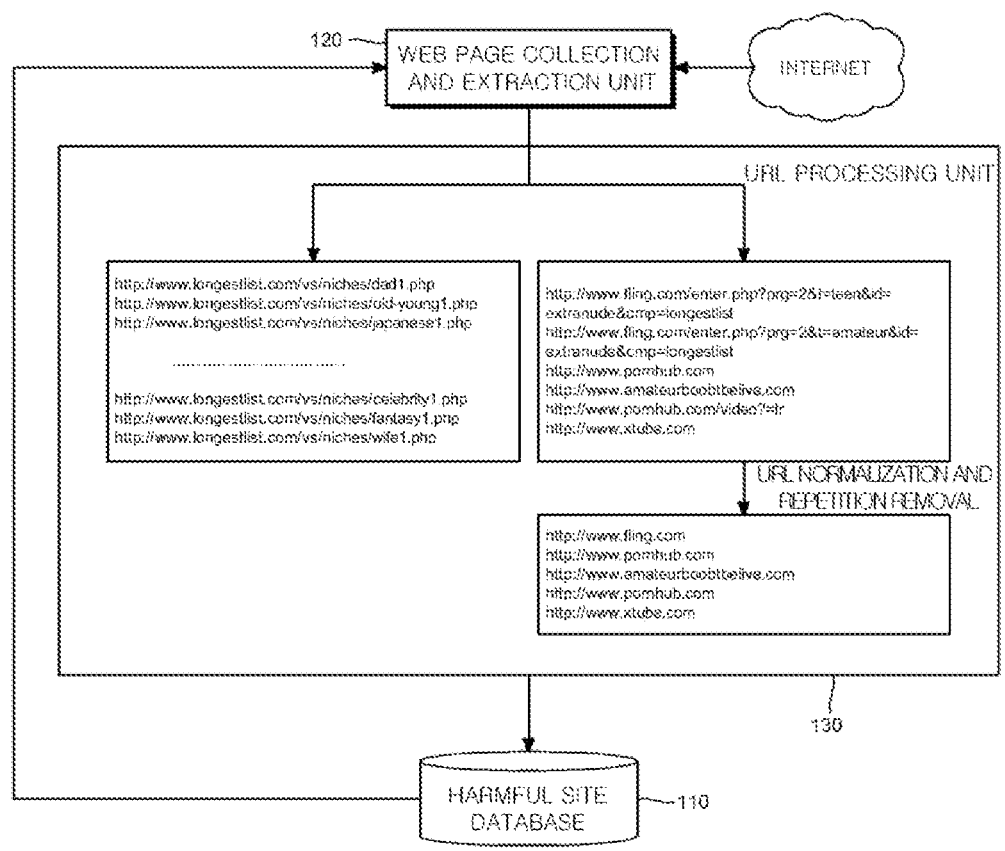
FIG. 2 is a conceptual diagram for describing an operation of a URL processing unit of FIG. 1.
Figure 3:
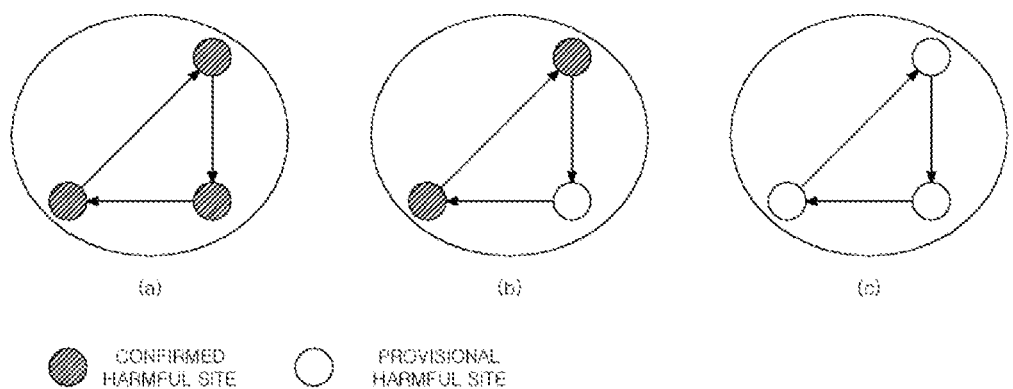
FIG. 3 is a diagram for describing directed graphs that are calculated by a harmful site connection analysis unit of FIG. 1.

FIG. 1 is a block diagram showing a harmful site collection device according to an embodiment of the present invention, FIG. 2 is a conceptual diagram for describing an operation of a URL processing unit of FIG. 1, and FIG. 3 is a diagram for describing directed graphs that are calculated by a harmful site connection analysis unit of FIG. 1.

A harmful site collection device 100 may include a harmful site database 110, a webpage collection and extraction unit 120, a URL processing unit 130, and a harmful site connection analysis unit 140.

The harmful site database 110 may store a harmful site list. The harmful site list may be a list in which information on uniform resource locators (URLs) of harmful sites is arranged. The harmful site database 110 may store a list of URL information of confirmed harmful sites and a list of URL information of provisional harmful sites. The harmful site database 110 may store URL information on harmful sites that are not provisionally classified or confirmed but used to calculate ranks thereof.

The web page collection and extraction unit 120 may collect and extract information on a corresponding web page in a web crawling technique. The web page collection and extraction unit 120 may receive the URL of the confirmed harmful site from the harmful site database 110 and download a corresponding web page from the Internet. The web page collection and extraction unit 120 may parse the downloaded web page to extract information on all links. Here, the link information may include URL information or IP information, and the URL information may be defined as a hyper text markup language (HTML) tag as below:

a href="http://www.host.com/dirctory/file.html">Link</a>.     Equation 1

The URL processing unit 130 may divide the extracted URL information into sub-page URL information and other-page URL information. The URL processing unit 130 may compare the extracted sub-page URL information and other-page URL information with URL information prestored in the harmful site database 110 to extract only new URL information. The URL processing unit 130 may add the extracted new URL information to a provisional harmful site list in the harmful site database 110.

Referring to FIG. 2, the web page collection and extraction unit 120 receives a URL of a confirmed harmful site from the harmful site database 110 and downloads a web page corresponding to the URL. The web page collection and extraction unit 120 may parse the web page to extract link information in a web crawling technique. The URL processing unit 130 may divide URL information included in the link information into sub-page URL information and other-page URL information. The URL processing unit 130 compares the sub-page URL information with harmful site URL information stored in the harmful site database 110, determines whether the sub-page is visited, extracts only URL information on sub-pages that have never been visited, and stores the extracted sub-page URL information in the harmful site database 110. The URL processing unit 130 may normalize the other-page URL information and extract representative URL information. Here, the normalization of the other-page URL information denotes a series of process of removing a subdirectory from among the URL information, extracting URL information only having "protocol information" and "position information regarding a computer having information resources," and removing repeated URL information from among the extracted URL information. For example, the normalization denotes a series of process of extracting URL information (3) obtained by removing a subdirectory from URL information (1) or URL information (2).

1) http://www.fling.com/enter.php?prg=2&t=teen&id 2) http://www.fling.com/
enter.php?prg=2&t=amateur&id 3) http://www.fling.com/   Equation 2

The URL processing unit 130 may compare the representative URL information obtained by normalizing the other-page URL information with the harmful site URL information stored in the harmful site database 110 and add a new representative URL information to the provisional harmful site list in the harmful site database 110.

The harmful site connection analysis unit 140 may create a directed graph that indicates connection flow information of a provisional harmful site and confirm the provisional harmful site as a harmful site. The directed graph denotes a graph in which any provisional harmful site is designated as a start point, another site referenced by the provisional harmful site is designated as a first intermediate point, another site referenced by the site of the first intermediate point is designated as a second intermediate point, and a circulation is found in the same manner and ultimately returned to the provisional harmful site corresponding to the start point. Referring to FIG. 3, in case of (a), a directed graph indicating a circulation of confirmed harmful sites is shown. This reflects that there is a high possibility that the harmful sites will reference one another. In case of (b), a circulation is formed by the confirmed harmful sites and the provisional harmful site, and in this case, the provisional harmful site may be confirmed as a harmful site. In case of (c), a circulation is not formed by the confirmed harmful sites and the provisional harmful sites, and thus the provisional harmful sites are not confirmed as harmful sites. However, even in case of (c), there may be a harmful site. Thus, in an embodiment to be described below, ranks of the provisional harmful sites are calculated and provided to a user.

The directed graphs in FIG. 3 have three vertices. However, it will be appreciated that the graphs may have the form of a straight line connecting two vertices or a polygon having four or more vertices. In addition, it will also be appreciated that the directed graph may be an acyclic graph in which a circulation is not formed. In this case, the provisional harmful site included in the acyclic graph is not confirmed as the harmful site.

Figure 4:
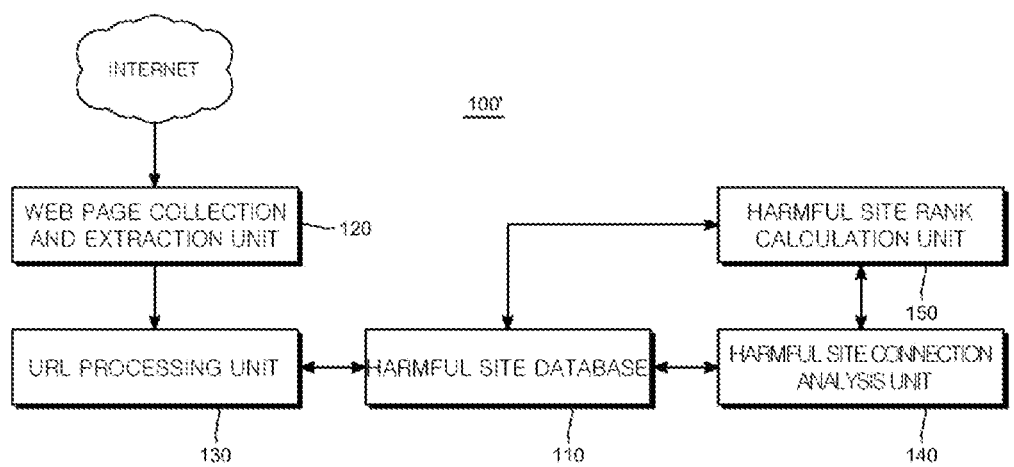
FIG. 4 is a block diagram showing a harmful site collection device according to another embodiment of the present invention.
Figure 5:
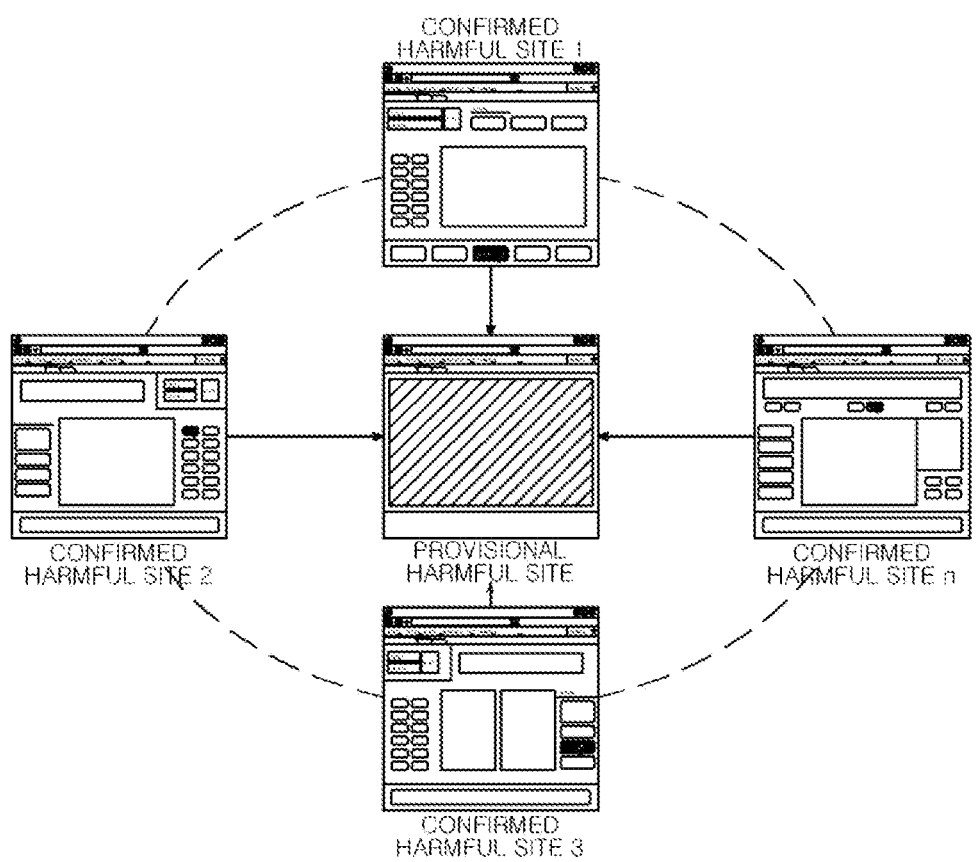
FIG. 5 is a conceptual view for describing a principle in which a rank is calculated by a harmful site rank calculation unit of FIG. 4.

FIG. 4 is a block diagram showing a harmful site collection device according to another embodiment of the present invention, and FIG. 5 is a conceptual view for describing a principle in which a rank is calculated by a harmful site rank calculation unit of FIG. 4.

Compared to an embodiment of FIG. 1, an embodiment of FIG. 4 is characterized in that a harmful site rank calculation unit 150 is additionally included. Accordingly, the description of the same components as those of FIG. 1 is not repeated.

The harmful site rank calculation unit 150 may calculate harmful site ranks of the provisional harmful sites that are not confirmed as a harmful site by the harmful site connection analysis unit 140. This is performed because there may be a harmful site even when the harmful site connection analysis unit 140 creates an acyclic directed graph or creates a cyclic directed graph but the provisional harmful sites do not reference the confirmed harmful site and thus the provisional harmful sites are not confirmed as the harmful site.

The harmful site rank calculation unit 150 uses a page rank scheme to calculate a rank of a provisional harmful site that is not confirmed as a harmful site. Specifically, the harmful site rank calculation unit 150 may calculate a rank of a provisional harmful site according to the number of times a confirmed harmful site references the provisional harmful site. This is because, if the number of times the confirmed harmful site references the provisional harmful site is great, the provisional harmful site is likely to be a harmful site. Referring to FIG. 5, the provisional harmful site has a higher harmful site rank as the number of confirmed harmful sites that reference the provisional harmful site increases.

Figure 6:
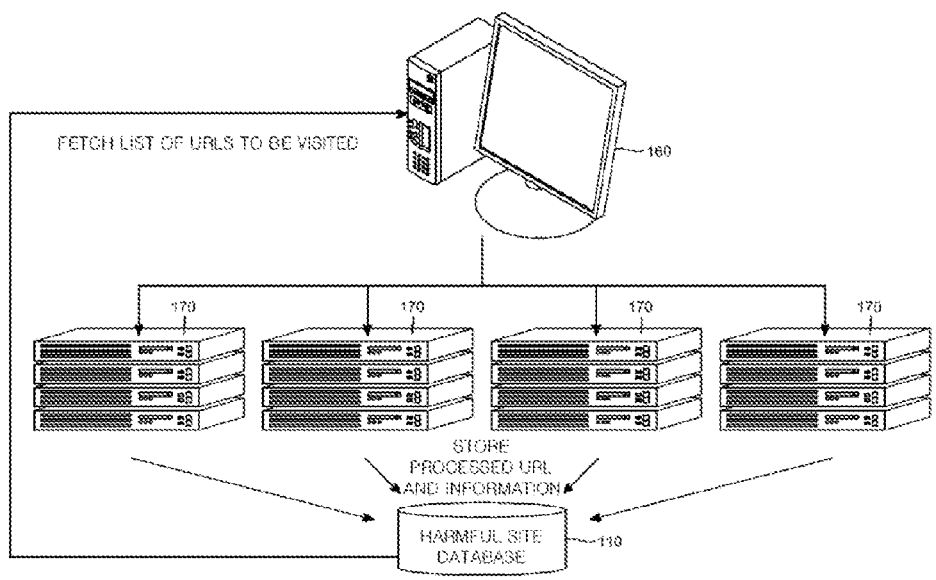
FIG. 6 is a diagram for describing a distributed processing method of the harmful site collection device according to an embodiment of the present invention.

FIG. 6 is a diagram for describing a distributed processing method of the harmful site collection device according to an embodiment of the present invention.

The harmful site collection device 100 may be configured to include a distributed processing master device 160 and distributed processing slave devices 170, which may shorten the time needed to collect and process information by the web page collection and extraction unit 120, the URL processing unit 130, the harmful site connection analysis unit 140, and the harmful site rank calculation unit 150.

The distributed processing master device 160 may receive a list of URLs to be visited from the harmful site database 110 and assign the URL list to the distributed processing slave devices 170. Each distributed processing slave device 170 may collect and process web sites corresponding to the assigned URL list to update harmful sites or may calculate a rank of the provisional harmful site and store the calculated rank in the harmful site database 110.

It can be seen that a processing speed of the above-described method may increase in proportion to the number of distributed processing slave devices 170, compared to a method in which the distributed processing master device 160 operates independently.

Figure 7:
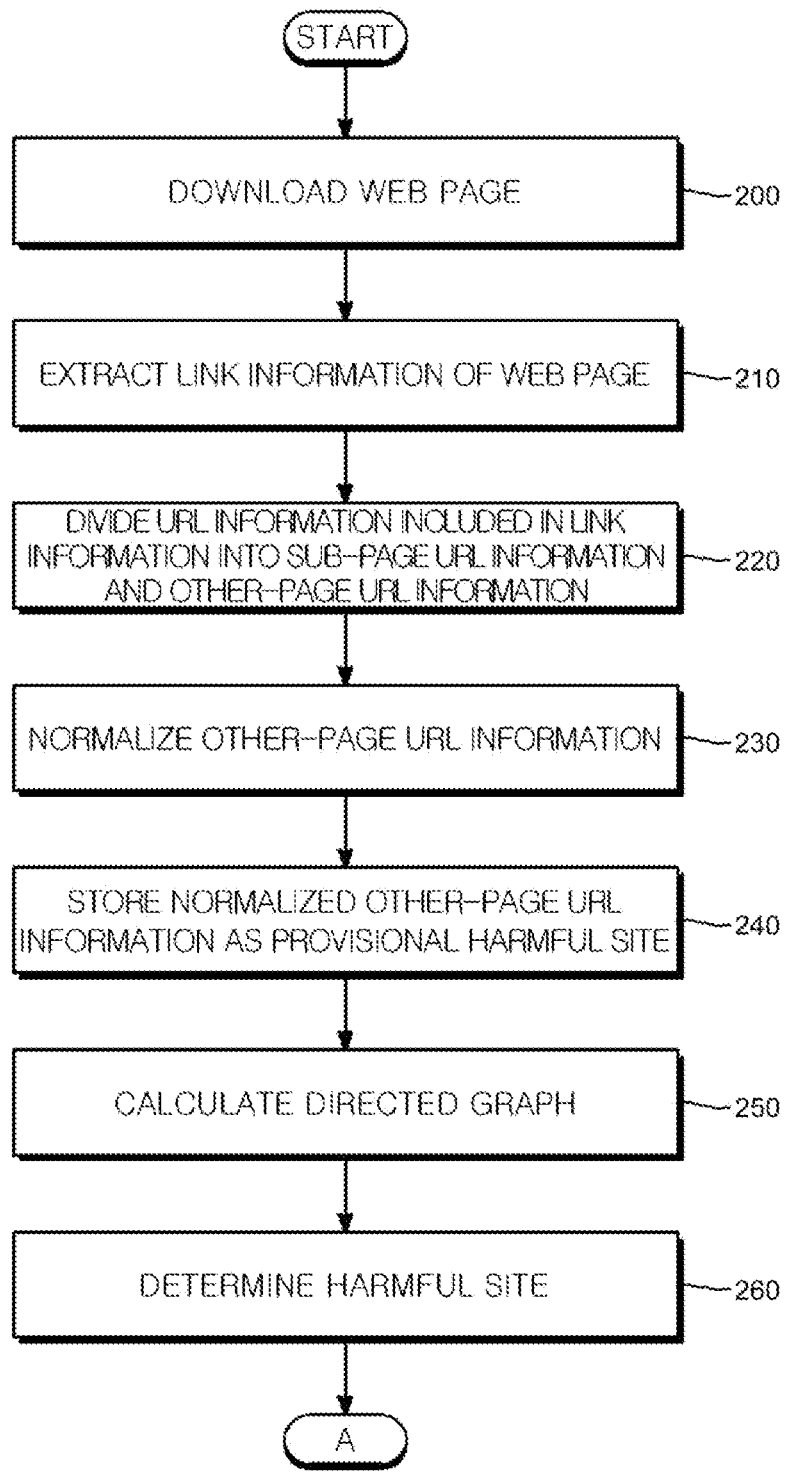
FIG. 7 is a control flowchart of the harmful site collection device according to an embodiment of the present invention.

FIG. 7 is a control flowchart of a harmful site collection device according to an embodiment of the present invention.

The webpage collection and extraction unit 120 receives information on URLs to be visited from the harmful site database 110 and downloads a web page corresponding to the received URL information (200).

The web page collection and extraction unit 120 extracts link information of the web page in a well-known web crawling technique (210).

The URL processing unit 130 may divide the extracted URL information into sub-page URL information and other-page URL information. The URL processing unit 130 may compare the extracted sub-page URL information and other-page URL information with URL information prestored in the harmful site database 110 to extract only new URL information (220).

The URL processing unit 130 normalizes the other-page URL information to extract representative URL information. As described above, the normalization of the other-page URL information denotes a process of removing a subdirectory from among the URL information and extracting only top URL information (230).

The URL processing unit 130 stores the normalized URL information in the harmful site database 110 as a provisional harmful site (240).

The harmful site connection analysis unit 140 may create a directed graph indicating connection flow information of the provisional harmful site to determine a harmful site. As described above, the harmful site connection analysis unit 140 may analyze reference of the provisional harmful site to confirm the provisional harmful site as a harmful site when the provisional harmful site forms a circulation with a harmful site and to determine the provisional harmful site not to be a harmful site when the directed graph is not closed or when the directed graph is closed but the provisional harmful site does not reference a confirmed harmful site (250, 260).

Figure 8:
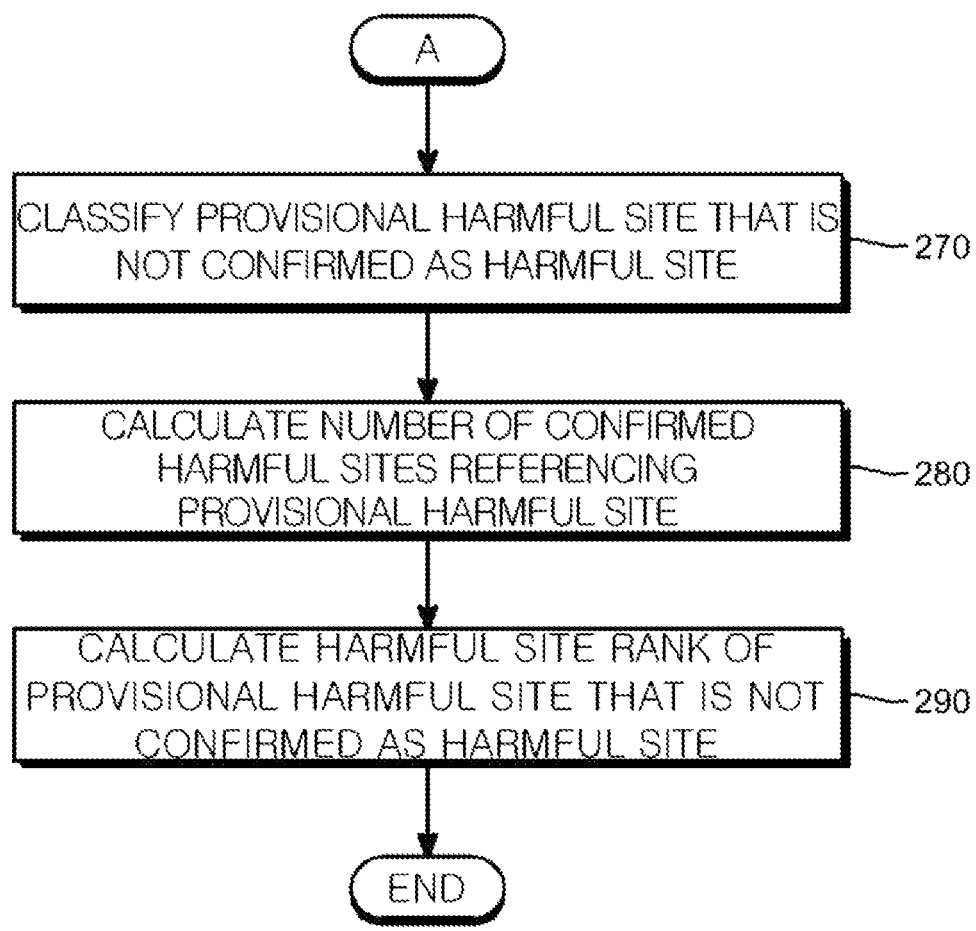
FIG. 8 is a control flowchart of the harmful site collection device according to another embodiment of the present invention.

FIG. 8 is a control flowchart of a harmful site collection device according to another embodiment of the present invention.

FIG. 8 is a flowchart for describing a method of calculating a rank of the provisional harmful site that is not yet confirmed as a harmful site after the control flow of FIG. 7 is completed.

The harmful site rank calculation unit 150 may classify provisional harmful sites that are not confirmed as a harmful site by the harmful site connection analysis unit 140 (270).

The harmful site rank calculation unit 150 uses a page rank scheme to calculate a rank of a provisional harmful site that is not confirmed as a harmful site. Specifically, the harmful site rank calculation unit 150 may calculate the number of confirmed harmful sites that reference the provisional harmful site (280).

The harmful site rank calculation unit 150 may calculate a rank of the provisional harmful site in proportion to the number of confirmed harmful sites that reference the provisional harmful site. Although the provisional harmful site is not confirmed through the directed graph, the provisional harmful site may be likely to be the harmful site when the number of harmful sites that reference the provisional harmful site is great. Therefore, this process provides the rank of the provisional harmful site using the above-described method and enables independent determination (290).

Figure 9:
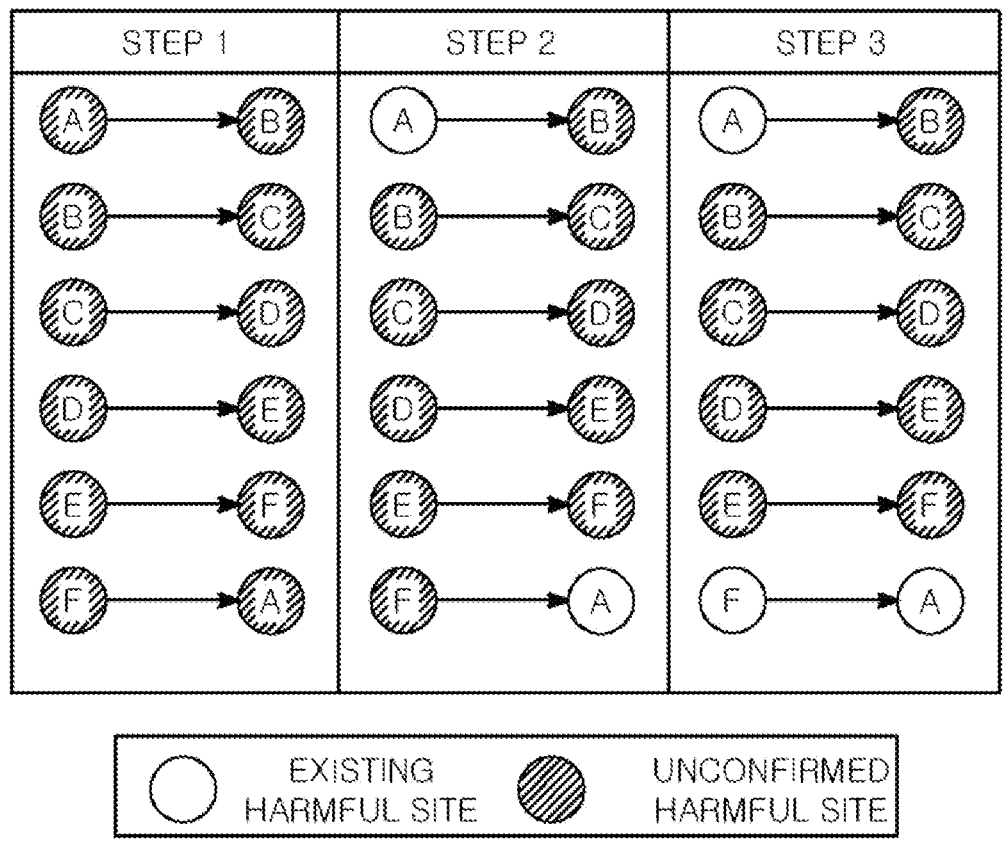
FIG. 9 is a conceptual diagram for describing a method of determining, by the harmful site collection device, a harmful site at a high speed according to an embodiment of the present invention.

FIG. 9 is a conceptual diagram for describing a method of determining, by the harmful site collection device, a harmful site at a high speed according to an embodiment of the present invention.

As described above, the harmful site collection device 100 creates a directed graph using link connection information of harmful sites, find a circulation, and determine all sites included in the circulation are harmful when an existing harmful site is in the circulation.

The harmful site collection device 100 may determine a harmful site at a high speed using a Bottom-Up type harmful site determination algorithm. The harmful site collection device 100 collects links between sites based on the link information of the harmful sites and determines a start point as a harmful site when an end point is an existing harmful site. This process is repeated. Referring to FIG. 9, in step 1, the harmful site collection device 100 enters an existing harmful site list and collects a connection between sites. In step 2, the harmful site collection device 100 determine whether referenced (that is, directed) sites in the collected connection between sites are included in the existing harmful site list. In step 3, when any one of the referenced sites is an existing harmful site, the harmful site collection device 100 determines that a referencing site is a harmful site and adds the referencing site to the harmful site list. When the list is updated in step 3, the harmful site collection device 100 performs step 2 again and then proceeds to step 3. The harmful site collection device 100 repeats step 2 and step 3 until the harmful site list is no longer updated, and thus completes the recent harmful site list. Unlike a data processing method that creates a graph, the above-described bottom-up scheme uses only connections, and thus can be advantageous in the distributed processing, be easily implemented, and reduce a data throughput.

Although the present invention has been described with reference to exemplary embodiments thereof, it should be understood that numerous other modifications and variations can be made without departing from the spirit and scope of the present invention by those skilled in the art. It is obvious that the modifications and variations fall within the spirit and scope thereof.

The invention claimed is:

1. An apparatus for collecting harmful website information comprising:
    a harmful website database unit, implemented in a hardware processing device, storing a list of harmful Uniform Resource Locators (URLs) including a first Uniform Resource Locator (URL) of a first harmful website;
    a web page collection and extraction unit, implemented in the hardware processing device, collecting a first web page of the first URL of the first harmful website and extracting a second URL that is contained in the first web page of the first URL of the first harmful website, wherein a second web page of the second URL of a second website contains a third URL;
    a harmful website connection analysis unit, implemented in the hardware processing device, analyzing whether the third URL contained in the second web page directly or indirectly references back to the first harmful website and determining that the second website becomes a confirmed harmful website if the third URL contained in the second web page references directly or indirectly back to the first harmful website; and
    a harmful site rank calculation unit, implemented in the hardware processing device, calculating, in response to the analyzing determining the third URL does not reference back directly or indirectly to the first harmful website, a harmful website ranking of the second web page based on a number of harmful sites that refer to the second web page.

2. The apparatus of claim 1, wherein the apparatus further comprises a URL processing unit, implemented in the hardware processing device, dividing URL information contained in the first web page into sub-pages and remainder pages, which exclude the sub-pages, and extracting a first representative URL from each of the remainder pages by deleting a subdirectory internet address of the remainder pages.

3. The apparatus of claim 2, wherein the URL processing unit compares each of the first representative URLs with the list of harmful URLs stored in the harmful website database unit and disregards a respective first representative URL if the respective first representative URL is already included in the list of harmful URLs.

4. The apparatus of claim 1, wherein the list of harmful URLs includes a candidate harmful website, wherein the candidate harmful website has not been confirmed as a harmful website.

5. The apparatus of claim 4, wherein the harmful website connection analysis unit calculates a connection between the candidate harmful website and web pages referenced by the candidate harmful website to determine whether the candidate harmful website is harmful.

6. The apparatus of claim 2, wherein the harmful website connection analysis unit generates a directed graph showing connection relations among the first URL, the second URL, the third URL, and the remainder pages.

7. An apparatus for collecting harmful website information comprising:
- a harmful site database unit, implemented in a hardware processing device, storing a list including at least a first confirmed harmful website Uniform Resource Locator (URL) and a first harmful website candidate URL;
- a web page collection and extraction unit, implemented in the hardware processing device, collecting a first web page indicated by the first confirmed harmful website URL and extracting URL information including a second URL that is contained in the first web page, wherein a second web page of the second URL of a second website contains a third URL;
- a URL processing unit, implemented in the hardware processing device, dividing the URL information contained in the first web page into sub-page URL and remainder page URLs, extracting a representative URL from each of the remainder page URLs by deleting a subdirectory internet address of the remainder page URLs, and storing the representative URLs into a harmful website database;
- a harmful site connection analysis unit, implemented in the hardware processing device, analyzing whether the third URL contained in the second web page directly or indirectly references back to a first harmful website of the first confirmed harmful website URL and determining that the second website becomes a confirmed harmful website if the third URL contained in the second web page references directly or indirectly back to the first harmful website; and
- a harmful site rank calculation unit, implemented in the hardware processing device, calculating, in response to the analyzing determining the third URL does not reference back directly or indirectly to the first harmful website, a harmful website ranking of the second web page based on a number of harmful sites that refer to the second web page.

8. A method of collecting a harmful website information, the method comprising:
- extracting a second Uniform Resource Locator (URL) from a first web page of a first harmful website, wherein the first harmful website has a first URL;
- checking a connection between the first harmful website and a third URL that is contained in a second web page of a second website of the second URL whether the third URL directly or indirectly references back to the first harmful website;
- determining the second website of the second URL is harmful if the third URL directly or indirectly references back to the first harmful website; and
- calculating, in response to determining the third URL does not reference back directly or indirectly to the first harmful website, a harmful website ranking of the second web page based on a number of harmful sites that refer to the second web page.

9. The method of claim 8, wherein the extracting of the second URL comprises downloading the first harmful website, and extracting all URLs linked in the first harmful website using a web crawling technique.

10. The method of claim 8, wherein the checking comprises generating a directed graph.

* * * * *